(12) United States Patent  (10) Patent No.: US 7,571,566 B1
Taylor  (45) Date of Patent: Aug. 11, 2009

(54) CONTAINER AND METHOD OF USE

(75) Inventor: Nancy A. Taylor, Houston, TX (US)

(73) Assignee: Taylor Interior Architecture, Inc., Houston, TX (US)

( * ) Notice: Subject to any disclaimer, the term of this patent is extended or adjusted under 35 U.S.C. 154(b) by 0 days.

(21) Appl. No.: 12/243,662

(22) Filed: Oct. 1, 2008

Related U.S. Application Data

(63) Continuation-in-part of application No. 11/021,740, filed on Dec. 22, 2004, now abandoned.

(51) Int. Cl.
*A47G 7/06* (2006.01)
(52) U.S. Cl. .................................................. 47/41.01
(58) Field of Classification Search ................ 206/423; 47/41.01, 72
See application file for complete search history.

(56) References Cited

U.S. PATENT DOCUMENTS 3,127,011 A * 3/1964 Weddle ...................... 206/423
4,801,014 A * 1/1989 Meadows .................... 206/423
D302,404 S * 7/1989 Weder ........................ D11/153
D540,506 S * 4/2007 Hihnala et al. ............... D1/105

FOREIGN PATENT DOCUMENTS

| FR | 2693992 | * | 4/1994 |
| JP | 05132089 | * | 5/1993 |
| JP | 06122489 | * | 5/1994 |
| JP | 2008167775 | * | 7/2008 |

* cited by examiner

*Primary Examiner*—Francis T Palo
(74) *Attorney, Agent, or Firm*—Conley Rose, P.C.

(57) ABSTRACT

A container and its use capable of containing liquid and at least one stem of a floral product having a first portion and a second portion, the container comprising an intermediate portion capable of collapsing around at least a portion of each stem between the first portion and the second portion and securing the floral product and maintaining a weight such as a liquid located in the second portion therein.

25 Claims, 6 Drawing Sheets

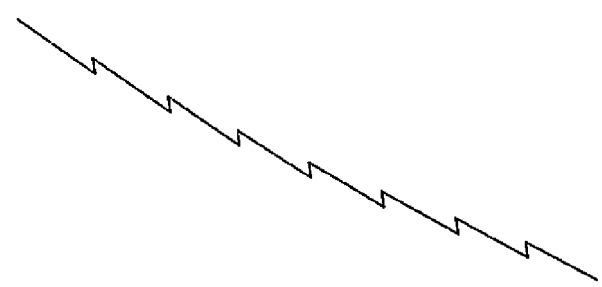
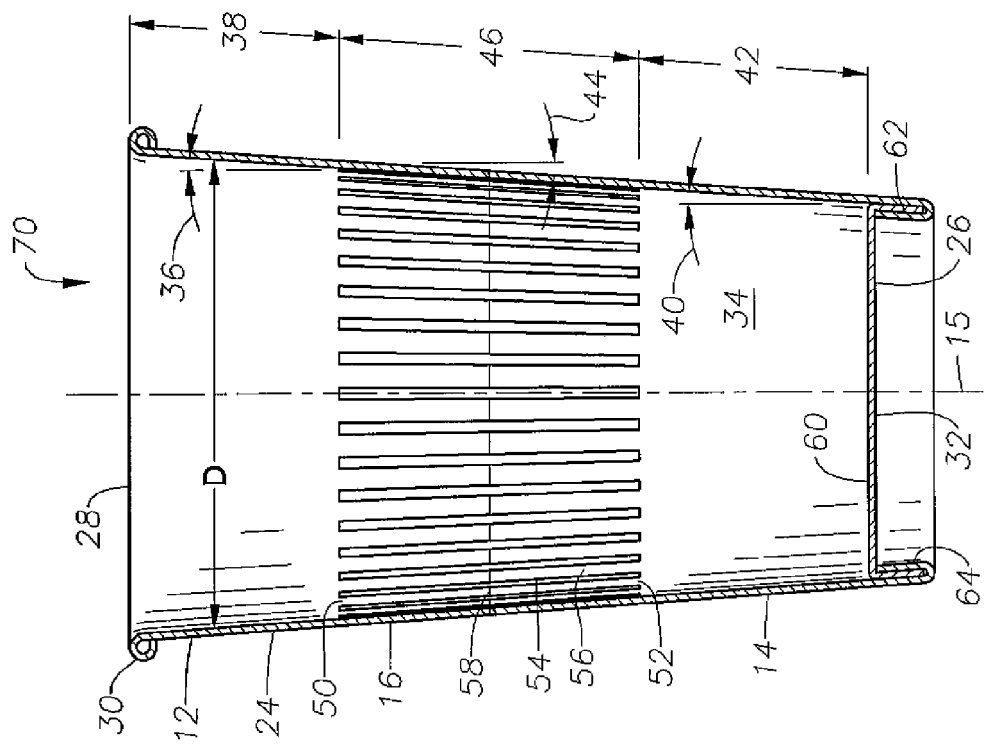

CONTAINER AND METHOD OF USE

CROSS-REFERENCE TO RELATED APPLICATIONS

This application is a continuation-in-part of U.S. patent application Ser. No. 11/021,740 filed Dec. 22, 2004, entitled "Container and Method of Use", now abandoned, hereby incorporated herein by reference.

STATEMENT REGARDING FEDERALLY SPONSORED RESEARCH OR DEVELOPMENT

Not applicable.

BACKGROUND

1. Field of the Invention

The present invention relates to the containment of liquids and objects, including floral items.

2. Background of the Invention

The purchaser of a floral bouquet meets with difficulty in transporting the bouquet from the point of purchase, such as a supermarket or florist, to its final destination, such as the purchaser's home or business. If the purchaser doe not wish to keep the floral bouquet in water, a sleeve may be used to house the bouquet. If the purchaser desires to keep the floral bouquet in water, the purchaser has to either use a plastic or glass vase in order to contain the floral products. These items are either a separate cost or a significant expense that is incorporated into the cost of the floral product.

The current, temporary vase options are visually unappealing and are relatively expensive to manufacturer. Moreover, glass and plastic vases require significant expense and effort to be shipped and storage at the point of purchase. Finally, these vases are usually thrown away shortly after the floral product arrives at its final destination. This routine disposal adds a cumulatively significant amount of trash to our landfills.

Disposable alternatives are typically cumbersome, fail to provide for the containment of water in a manner that provides both durability and simplicity, and typically do not provide for a method of practically containing both liquid and the floral products. Attempts to address the problems have been inadequate.

For example, U.S. Pat. No. 6,665,982 provides a floral bouquet bag, but fails to provide a method of conveniently containing liquid and requires a separate water container. Moreover, the bag must be assembled prior to use. U.S. Pat. No. 6,227,439 and U.S. Pat. No. 6,170,739 provide for a flexible container for liquid but fail to provide for a method of securing the floral product in the bag and require assembly prior to use.

Other patents and disclosures have disclosed methods that also fail to provide for a method to secure the floral product and conveniently contain the liquid in the container and typically require extensive assembly at the point of sale prior to use. As a result, a need exists to provide a securing method that will provide for the containment of liquid and objects for a temporary period. Therefore, a need exists to provide an alternative capable of containing liquid and objects such as floral products that are more efficient to manufacture, ship, store, use, and dispose.

SUMMARY OF THE INVENTION

A container capable of containing liquid and at least one stem of a floral product having a first portion and a second portion, the container comprising an intermediate portion capable of collapsing around at least a portion of each stem between the first portion and the second portion to support the floral product in the water. The preferred embodiment is capable of containing water and flowers for at least one week. In a most preferred embodiment, the intermediate portion includes a maintenance means such as either a paper or a wired portion about the collapsed intermediate portion.

Though those skilled in the art will recognize that a variety of materials may be used to form the container, it is preferable for the container to be made of paper that has a coating or lamination of plastic or wax. In a most preferred embodiment, the container is made of recyclable material or a biodegradable material. Further, the container maybe made of a plastic.

The disclosure includes a method of using the container to contain liquid and floral products for preferably at least one hour, more preferably at least one day, most preferably at least one week. When used, the container crimps about at least a portion of the stem of each floral product and holds each floral product in liquid. It is advantageous to manufacture the containers so as to allow stacking of the containers prior to use. Those skilled in the art will recognize that additional decorative accessories such as ribbons about the intermediate portion may be advantageous.

BRIEF DESCRIPTION OF THE DRAWINGS

While the specification concludes with claims particularly pointing out and distinctly claiming the invention, it is believed that the present invention will be better understood from the following description taken in conjunction with the accompanying drawing in which:

FIG. 6 is a cross-sectional elevation view of a container in its pre-use condition;

FIG. 6a illustrates an alternative shape of slit forming the intermediate portion of FIG. 6;

DETAILED DESCRIPTION OF THE PREFERRED EMBODIMENTS

Figure 1:
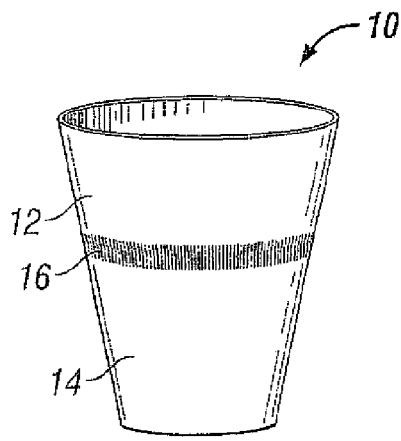
FIG. 1 is perspective view of a container in its pre-use condition.

The present invention is described with respect to floral products such as flowers, plants, and similar objects that are preferably disposed in a liquid such as water. Floral products particularly include cut flowers. The term floral products do not include potted plants such as plants planted in soil in a pot. Though the container is described in this setting, those skilled in the art will recognize that containers capable of containing liquids and objects, and significant variations thereof are considered to be within the scope of the invention.

Referring initially to FIG. 6, an embodiment of a receptacle or container 70 in its pre-use condition is shown. The container 70 preferably includes a first upper portion 12 and a second lower portion 14. Between the first portion 12 and the second portion 14 of the container 70, a medial or intermediate portion 16 is shown and forms an interface 50, 52 with first upper and second lower portions 12, 14, respectively. Thus, container 70 includes an upper portion 12 and a lower portion 14 with an intermediate portion 16 therebetween.

The container 70 has a side wall 24 which encloses a liquid receiving chamber 34. The container 70 has a closed bottom. The side wall 24 includes a paper layer that is continuous and is formed into a tapered outer configuration with the bottom 26 being narrower and the open mouth 28 of the container 70 being wider to provide access into the chamber 34.

Figure 10A:
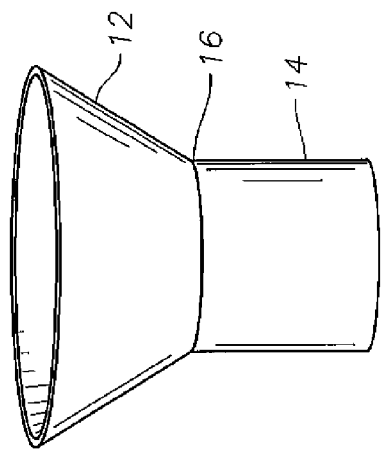
FIG. 10a illustrates an alternative shape of the container of FIG. 6.
Figure 10B:
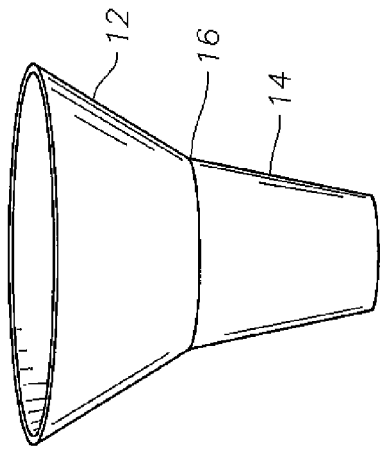
FIG. 10b illustrates a still another alternative shape of the container of FIG. 6.

The container 70 is formed so as to be symmetrical about a longitudinal axis 15 extending through the center of the container 70. Container portions 12, 14, 16 form peripheral sidewall 24 and may have the shape of a truncated cone. However, it is should be appreciated that the container may have other shapes such as those shown in FIGS. 10a and 10b. The container 70 also includes a floor or bottom 26 that is generally planar and in a plane normal to the longitudinal axis 15 of the container 70. Bottom 26 forms a closure member to close the lower end 32 of the container 70 and may be either formed integral with the peripheral sidewall 24 or attached to the peripheral sidewall 24 so as to form a liquid receiving receptacle 34 open at its upper end 28 and closed at its lower end 32. Thus the sidewall 24 and bottom 26 encloses a chamber 34 for containing water and receiving the stems of a floral product. It should be appreciated that the container 70 is self-sufficient and does not require an additional container, such as a pot, disposed inside the container. Container 70 is not a plastic wrap around an inner container such as is taught by the prior art.

The upper end 28 of the peripheral sidewall 24 may terminate in an annular rim 30 created by forming the upper edge of the upstanding sidewall 24 to establish an under-turned and inwardly directed wall portion. The annular rim 30 provides rigidity to the open end of the container to prevent it from being easily crushed.

It should be appreciated that the container 70 may have various shapes. As shown in FIG. 6, it is preferable that the sidewall 24 have the shape of a cone where the tapered wall of the first upper portion 12 has a slightly larger diameter than the tapered wall of the second lower portion 14. This permits the containers 70 to telescope to the extent that the right-cylindrical sidewall portions of one or more containers in a stack of nested containers telescope downwardly within the corresponding wall portion of the next below container. This stackable shape allows multiple containers 70 to be stacked in a nested relation prior to use for both ease of shipment to a floral provider and reduced storage requirements upon arrival at the point of sale.

As best shown in FIG. 6, first upper portion 12 has an angle 36 with vertical 15 and a height 38, and second lower portion 14 has an angle 40 with vertical 15 and a height 42. The intermediate portion 16 also has an angle 44 with vertical 15 and a height 46. The portions 12, 14, 16 are preferably circular in cross-section and have a diameter D, varying with the taper of the sidewall 24. In embodiments, the angles 36, 40, and 44 are the same but it should be appreciated that these angles may vary from one another. For example angle 36 may be larger than angles 40, 44. It should also be appreciated that angles 36, 40, and 44 may be 90 degrees to form a cylindrical container 10. It should be appreciated that the container need not be conical throughout but may have a conical shape for an upper portion that has a greater diameter than a cylindrical shaped lower portion. See for example FIGS. 10a and 10b.

Figure 9:
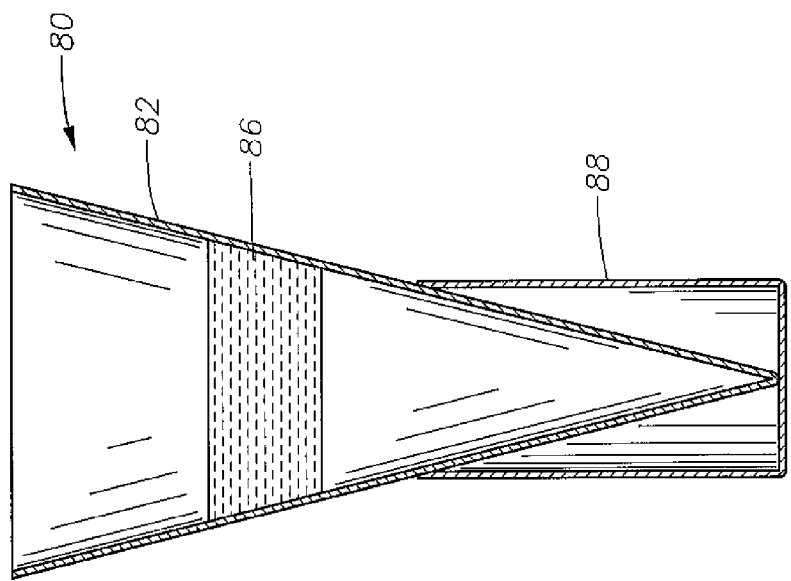
FIG. 9 is a cross-sectional elevation view of another embodiment of a container in its pre-use condition with a stand.

As shown in FIG. 9, in one embodiment, the container 80 does not have a bottom but may be a cone only having a conical sidewall 82. The sidewall has a perforated intermediate portion 86. In this embodiment, the container 80 may include a stand 88 that may or may not be part of the container 80. The stand 88 supports the floral product in an upright position. The stand 88 may or may not be a part of the container 80.

The containers of FIGS. 1-8, 10 and 11 are unitary and self-supporting. The container may have any dimensions and its dimensions will be determined by the number of flowers to be housed in the container and the length and weight of the flowers. Also if the flowers are top heavy because the petals or heads of the flowers have a great weight and/or the stems are very long, the container must have a height that will support the flowers and a sufficient volume in the second lower portion 14 of the container to hold a counterbalancing weight, such as water, marbles, pebbles or the like, to the side force of the flower stems extending out of the container to prevent the container from tipping over. Thus the height and/or diameter of the container should be capable of containing a weight, preferably a liquid, and floral products to avoid the flowers from falling over. In embodiments the container 70 may have a height in the range from about three to about sixteen inches and a range of diameters from about 2.5 inches to about eight inches. Preferably the height of the lower portion 14 is greater than the height of the upper portion 12. More preferably the height of the lower portion 14 is two-thirds the height of the container.

The container 70 may be made of various materials. In embodiments, the materials have a stiffness or rigidity whereby the container 70 will hold the flowers upright. The container 70 should not collapse, buckle or fold once the flowers are inserted into the container 70. Further, the material is water proof to allow the container 70 to hold water for the flowers. Further the bottom 26 of the container 70 has sufficient stiffness and rigidity so as to prevent the bottom 26 from being easily hand crushed or squeezed. For example, the material of container 70 may be paper or plastic.

It is preferable that the container 70 is made of paper, more preferably laminated or otherwise made water resistant or impermeable, such that the container 70 is capable of containing liquid for at least one hour, more preferably at least one day, most preferably at least one week. The material of the container 70 may be waxed paper. The paper of the cup would be pliable if the wax were to be removed. Typical cups include the Solo Hot Cup, 16 oz. Special Design Hot Cup, No. 316TA789, by Solo Cup Co., Chicago, Ill., or the Starbucks Hot Cup, 20.5 oz. Special Design Hot Cup, No. 422PCFJ0966. The container 70 may also include a plastic liner to make container 70 waterproof. The container 70 will preferably be disposable and will be preferably made of paper such as recycled material or biodegradable materials.

Further the container 70 is preferably composed of paper which is biodegradable in which the principal constituent is cellulose or vegetable fiber. The surface of the container 70 up may be rendered liquid-proof by coating the surface with a thin coating of a paraffin or microcrystalline wax or with a thin coating of a synthetic high polymer.

In a preferred embodiment, the chosen material has an outside surface of the container that will provide a medium for writing an individual message or machine printing a sentiment or holiday message. As with the decorative accessories 20 shown in FIG. 3, those skilled in the art will recognize that significant variation will be considered to be within the scope of the invention.

The intermediate portion 16 is a dissimilar weakened portion of the container 70 having dissimilar properties from the first upper and second lower portions 12, 14. In embodiments, the intermediate portion 16 is of the same material as the upper and lower portions 12, 14. The material of the side of the container 70 is preferably made from a common integral piece of material, i.e., is made of a unitary material.

The intermediate portion 16 is a treated or weakened portion of the sidewall 24 at a predetermined location on sidewall 24 during manufacturing so as to be weaker and less rigid than the upper and lower portions 12, 14. The treatment of the material of container 70 in forming intermediate portion 16 may take various forms to allow the intermediate portion 16 to be collapsed inwardly, such as by crushing, folding, twisting, crimping, collapsing or other collapsing means, such as compressing, condensing, pinching or squeezing, while first upper and second lower portions retain a sufficient rigid structure to support the floral product in the container 70. This allows the sidewall 24 to be first rigid at first upper portion 12, then pliable at intermediate portion 16, and then rigid again at second lower portion 14. In embodiments, the container is self-supporting prior to the insertion of a floral product and both before and after the intermediate portion 16 is collapsed.

Figure 2:
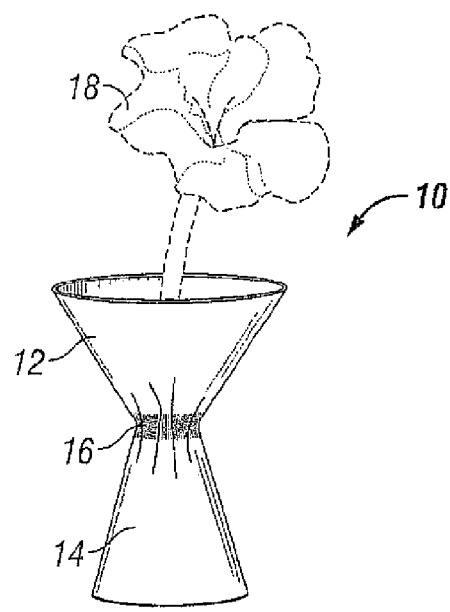
FIG. 2 is perspective view of the container of FIG. 1 in its post-use condition.

The container 70 is particularly designed to secure cut flowers in a water-containing container to serve as a temporary vase. It should be appreciated, however, that the container 70 may serve as a more permanent vase and be decorated for the display of the flowers. During use, a floral product 18 is inserted into the container 70 as shown in FIG. 2. Liquid such as water may be inserted prior to or after the insertion of the floral product 18. The intermediate portion 16 is located above the water line. It is preferable to only include liquid such that the liquid is located in the second lower portion 14 of the container 70 after the insertion of the floral product 18. It is important to note that the fluid, such as water, in the second lower portion 14 of the container 70 has the advantage of providing the weight advantageous to keeping the container 70 upright. In embodiments, the intermediate portion is located at approximately two-thirds the height of the container. The intermediate portion 16 is crushed, folded, twisted, crimped or collapsed allowing intermediate portion 16 to collapse or fold inwardly around the stems of the floral product such that the container 70 is capable of securing about at least a portion of the stem or stems of the floral product(s) 18 to support the floral arrangement in the container 70 with the liquid being contained in the second portion 14 of the container 70 to maintain nourishment for the floral product 18. It should be appreciated container 70 is a container before the stems of the floral product are inserted and it remains a container after it is crushed, folded, twisted, crimped or collapsed around the stems of the floral product.

Various treatment means may be used to allow intermediate portion 16 to be crushed, folded, twisted, crimped or collapsed around the stems of the floral product 18 while the first upper and second lower portions 12, 14 remain non-crushable, non-foldable, non-twistable, non-crimpable, and non-collapsible so as to have sufficient stiffness or rigidity to support the floral product 18 upright in the container 70. The treatment means causes the material at intermediate portion 16 to be pliable or weakened and thus susceptible to being crushed, folded, twisted, crimped or collapsed. Although the material is preferably the same for portions 12, 14, 16, the treatment means changes the structure of the material at intermediate portion 16 from the structure of the material of portions 12, 14. The treatment means causes the intermediate portion 16 to be deformable and more easily deformable than the upper and lower portions 12, 14. The treatment means alters or weakens the fibers of the material causing the container to be pliable at intermediate portion 16. The treatment means allows the container to be transformed from a conical shape container to a vase-shaped container. Further the treatment area of intermediate portion 16 marks and indentifies the intermediate portion 16 between interfaces 50, 52 where the material is pliable and can be altered, as by crushing, folding, twisting, crimping or collapsing.

One treatment means includes chemically treating a predetermined area of the material forming sidewall 24 to weaken or soften the material causing it to be pliable and allowing it to be crushed, folded, twisted, crimped or collapsed while still allowing the first upper and second lower portions 12, 14 to maintain their stiffness or rigidity. One method of treating the intermediate portion 16 is the use of a spray technique to weaken the intermediate portion 16 of the sidewall 24.

Another treatment means includes pre-stressing a predetermined area of the material to weaken that area of the material so as to allow it to be crushed, folded, twisted, crimped or collapsed and still allow the first upper and second lower portions 12, 14 to maintain their stiffness or rigidity.

As shown in FIG. 1, a still another treatment means for a container 10 includes stamping or embossing a predetermined area of the material to form intermediate portion 16. Embossing includes causing the material to swell or protrude; to raise parts of the material in relief from the material's surface by mechanical means; to raise parts of the material's surface to form protuberances by pressure against a steel die roller cut or engraved with a pattern; or to produce in relief by stamping on the material such as paper or other impressionable surface. The intermediate portion 16 may have chads. The material may be scored at predetermined locations to cause intermediate portion 16 to be weakened. Also flutes or grooves may be formed in the material to form the intermediate portion 16. The collapsible, crushable, foldable, twistable or crimpable portion 16 may be crimped or embossed with a pleated design in order to facilitate collapsing, crushing, folding, twisting, or crimping the material to form a vase shape and to secure the floral product 18. The stamping or embossing may be performed on the interior side of sidewall 24 to direct inwardly the collapse of the intermediate portion 16. The intermediate portion 16 may have various shapes of pleats to facilitate the collapse of the intermediate portion 16.

A further treatment means includes perforating a predetermined area around the sidewall 24 as shown in FIG. 9 to weaken that area causing it to be susceptible to crushing, folding, twisting, crimping or collapsing.

A still further treatment means includes forming a plurality of vertical rows of tearing traces along a predetermined area of the material to form intermediate portion 16 thereby dividing the first upper portion 12 from the second lower portion 14.

A yet another treatment means may include a process of distressing a predetermined area around the sidewall 24 to weaken that area causing it to be susceptible to crushing, folding, twisting, crimping or collapsing.

Figure 8:
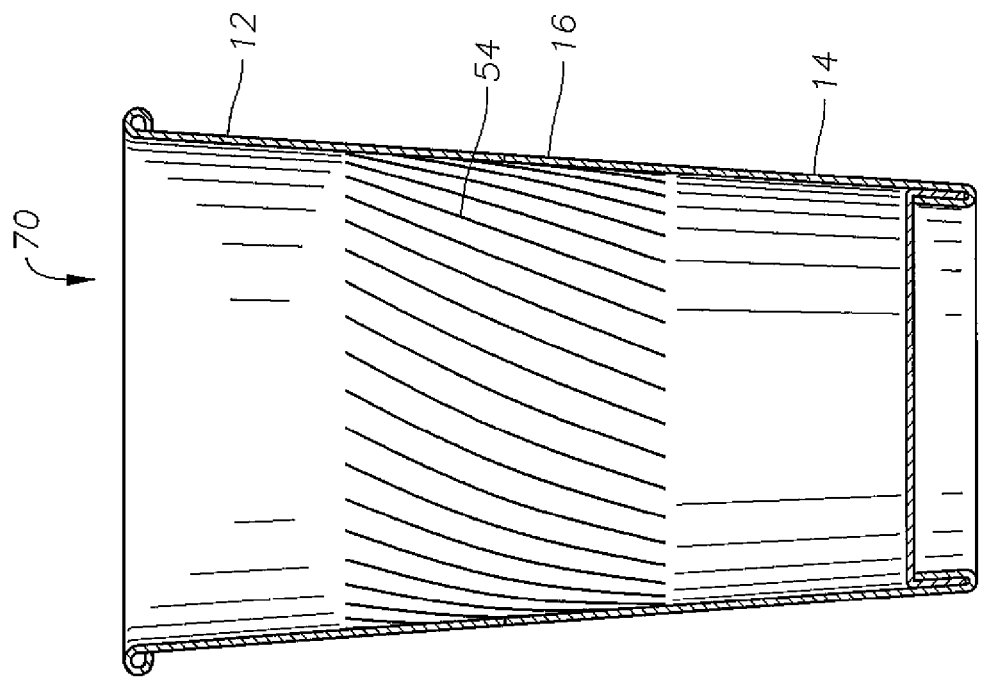
FIG. 8 is a cross-sectional elevation view of another embodiment of the container in its pre-use condition.

Referring again to FIG. 6, in embodiments, the treatment means includes cutting a plurality of slits 54 in the sidewall 24 at a predetermined area to form a plurality of ribs 56 around the mid-portion of the sidewall 24 to form intermediate portion 16. The dimensions such as the width and longitudinal length of the slits 54 and ribs 56 are set to provide sufficient rigidity to support the first upper and second lower portions 12, 14 and to support the stems of the floral product 18 in the container 70. The longitudinal length of the ribs 56 is preferably twice the length required of the ribs 56 to reach and engage the stems. The slits 54 may be rectangular as shown in FIG. 6 or of another shape, such as I-shaped, or another configuration. The slits in the intermediate portion may be at an angle as shown in FIG. 8 to make it easier to initiate a twisting of the intermediate portion 16. The slits 54 may be merely cuts in the side of the container as shown in FIG. 8 and may have various shapes and designs such as the zig-zag shown in FIG. 6a.

Figure 7:
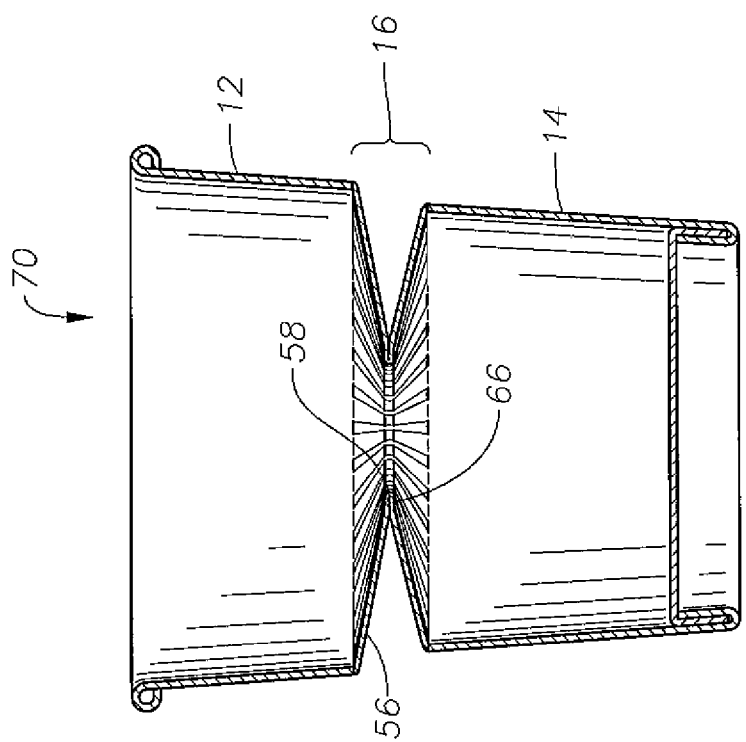
FIG. 7 is a cross-sectional elevation view of the container of FIG. 6 in its post-use condition.

Referring now to FIG. 7, to facilitate the inward collapse of the intermediate portion 16, the ribs 56 may be inwardly hinged or foldable. Ribs 56 may have a center fold 58 allowing the ribs 56 to be crushed, folded, twisted, crimped or collapsed inwardly either into engagement with the stems of the flowers or sufficiently near the stems to provide their support in the container 70. This allows the intermediate portion 16 to be inwardly foldable while the upper and lower portions 12, 14 are non-foldable. FIG. 7 show container 70 in a post-use condition.

Figures 11, 11A:
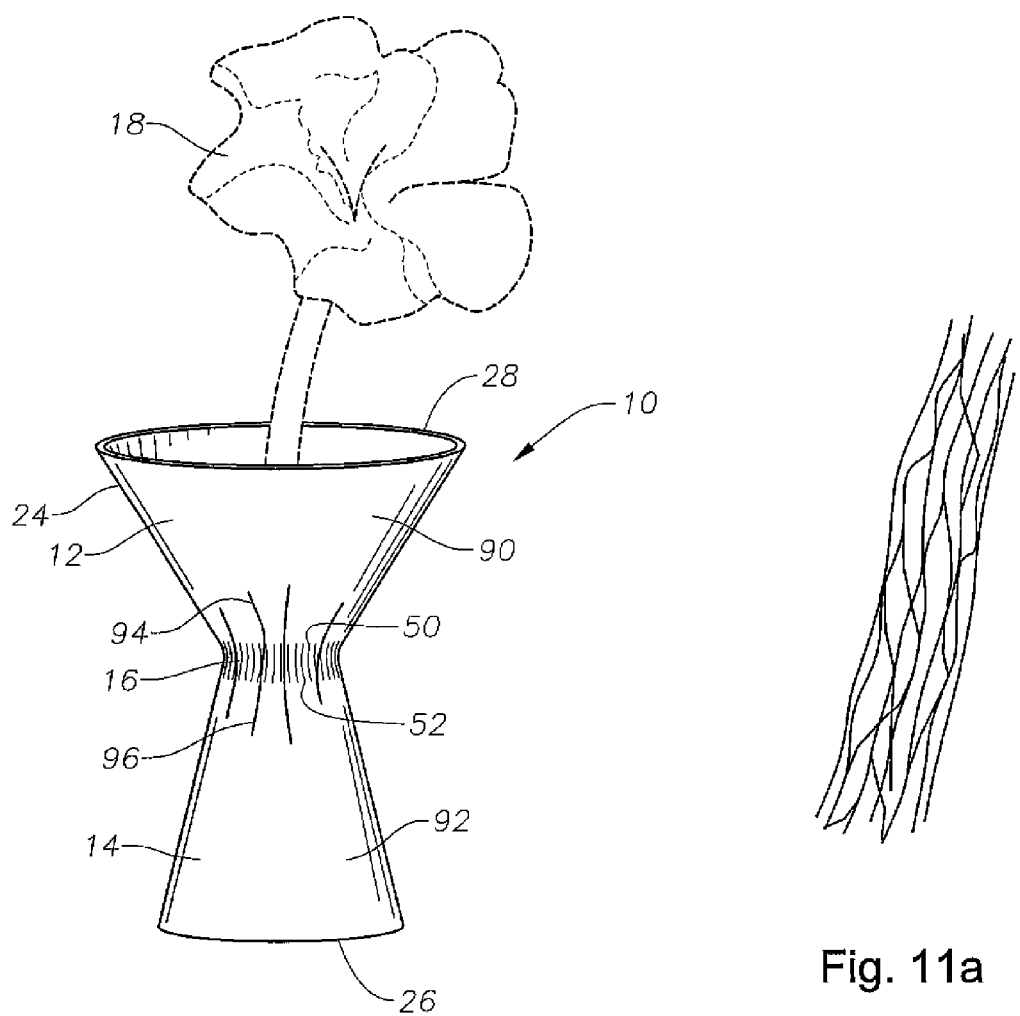
FIG. 11 is an enlargement of FIG. 2.
FIG. 11a illustrates a design to simulate pre-stressed material for the intermediate portion of FIG. 11.

Referring now to FIG. 11, which is an enlargement of FIG. 2, the container 10 is shown with the intermediate portion 16 collapsed. The open mouth 28 and the closed bottom 26 are shown to have substantially the same diameter as in the pre-collapsed position shown in FIG. 1. However, the first upper portion 12 and second lower portion 14 are shown to be deformed from the open mouth 28 to the interface 50 of intermediate portion 16 and from the closed bottom 26 to the interface 52 of intermediate portion 16. The deformable first upper portion 90 and deformable second lower portion 92 allow the upper and lower portions 12, 14 to deform upon collapsing intermediate portion 16 to allow the container 10 to achieve an upper conical shape and a lower conical shape with the small diameter ends of the cones meeting at intermediate portion 16. The deformable portions 90, 92 do not deform to the extent of the deformation of the intermediate portion 16. The deformation of the deformable portions 90, 92 accommodates the collapse of the intermediate portion 16.

The deformable portions 90, 92 may be treated by a first treatment means to cause the material of deformable portions 90, 92 to be pliable or weakened and thus susceptible to deformation upon intermediate portion 16 being crushed, folded, twisted, crimped or collapsed. The first treatment means allows the container 10 to be transformed from a conical shaped container to the double cone shape of FIG. 11 so that the container 10 can approach the shape of a vase-shaped container. Although the material is preferably the same for portions 12, 14, 16, the first treatment means changes the structure of the material of deformable portions 90, 92 of first upper and second lower portions 12, 14 from that of the structure of the material of intermediate portion 16 which has been treated with a second treatment means. The first treatment means causes the deformable portions 90, 92 to be less deformable than the intermediate portion 16 and yet still allow the first upper and second lower portions 12, 14 to maintain sufficient stiffness or rigidity to hold the floral product upright.

Various first treatment means may be used, such as at 94, 96 shown in FIG. 11. A first treatment means includes chemically treating a predetermined area of the material forming sidewall 24 to weaken or soften the material of deformable portions 90, 92 causing them to be pliable and allowing them to deform as intermediate portion 16 is crushed, folded, twisted, crimped or collapsed. In an embodiment, the first treatment means alters or weakens the fibers of the material of deformable portions 90, 92. Another first treatment means includes pre-stressing a predetermined area of the material to weaken that area of the material forming deformable portions 90, 92. A further embodiment of the first treatment means may include generally longitudinal folds or pleats, as shown in FIG. 11, or stressed material, as illustrated in FIG. 11a.

It should be appreciated that the first treatment means for deformable portions 90 may be different than that of deformable portions 92. For example, the first treatment means may include stamping or embossing upper deformable portions 90 and chemically treating the lower deformable portions 92 so that the second lower portion 14 will still hold water.

It also should be appreciated that deformable portions 90, 92 need not extend from interfaces 50, 52 to mouth 28 and bottom 26, respectively, but may extend from one or both of the interfaces 50, 52 at a longitudinal length less than that to the mouth 28 and bottom 26 thereby forming deformable borders around intermediate portion 16. It should further be appreciated that the deformability of deformable portions 90, 92 may approach the deformability of intermediate portion 16 adjacent interfaces 50, 52 and than gradually decrease in deformability as they extend towards mouth 28 and bottom 26 where there is less need to accommodate for the collapse of intermediate portion 16.

Figure 3:
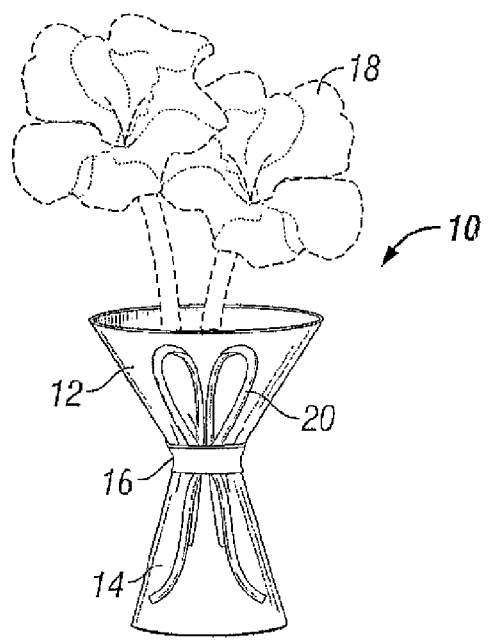
FIG. 3 is perspective view of another embodiment of the container of FIG. 1 in its post-use condition.

In operation, container 70 is a single unit container in that its pre-use condition is a container and its post-use is a container. Container 70 starts as a container and ends as a container. It is envisioned that a plurality of floral products 18 may be supported or secured in the container 70. As shown in FIG. 3, a plurality of floral products 18 is disposed in a container 10 such that the intermediate portion 16 supports or secures the floral products 18 in container 10. In embodiments the collapsible intermediate portion 16 is located above a center of the container to support the at least one stem and extends around the container to form an annular collapsible portion. In embodiments the container has a height that is greater than one-half the height of the at least one stem to support the floral product upright. The intermediate portion 16 may maintain itself in the inwardly crushed, folded, twisted, crimped or collapsed position. The material and/or selection of treatment means may retain the intermediate portion 16 in its inward position.

Other maintenance means may be provided to maintain the intermediate portion 16 in its inward position. In embodiments, the exterior of ribs 56 may include an adhesive as shown in FIG. 7 that adheres to the fold of each rib 56 at 66 after it is folded so as to cause the adjacent surfaces at 66 of the ribs 56 to engage and adhere to each other. Referring to FIG. 8, the interior of the intermediate portion 16 may include an adhesive whereby upon twisting the ribs so as to overlap, the ribs stick together to hold the container 70 in the twisted position. A protective paper strip may be used to cover the adhesive and then be removed during use in the post-use condition.

Figure 5:
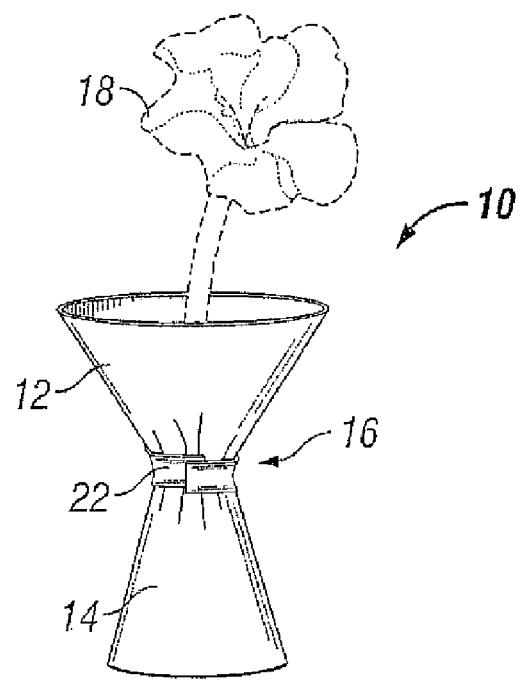
FIG. 5 is perspective view of another embodiment of the container in its post-use condition showing a crimp about an intermediate portion of the container in its post-use condition.

Referring now to FIGS. 3 and 5, the maintenance means may include either paper or wire elements such as a wired crimp or a paper crimp that can be placed on the intermediate portion 16 after it has been crushed, folded, twisted, crimped or collapsed to insure that the intermediate portion 16 stays in contact with the floral product 18 and keeps the floral product 18 secure during use. It should be appreciated that a paper/ wire tie may be used where the wire is embedded in the paper or covered by paper strips. Moreover, the maintenance means may include a ribbon 20 or similar decorative accessory about the intermediate portion 16. Other maintenance means includes a reinforced tape of paper and/or cellophane, double stick tape, a band with an adhesive surface on one end, a plastic electrical tie, or a draw string. A further maintenance means includes an elastic member, such a rubber band, extending around the intermediate portion 16. It should also be appreciated that the maintenance means may be a part of the container 70 or be secured to the container 70. By way of example, one end of a paper tie may be attached to the container 70. The maintenance means may also include a decorative ribbon or cover over the maintenance means. Those skilled in the art will recognize that significant variation and inclusion of decorative accessories is considered to be within the scope of the invention.

Figure 4:
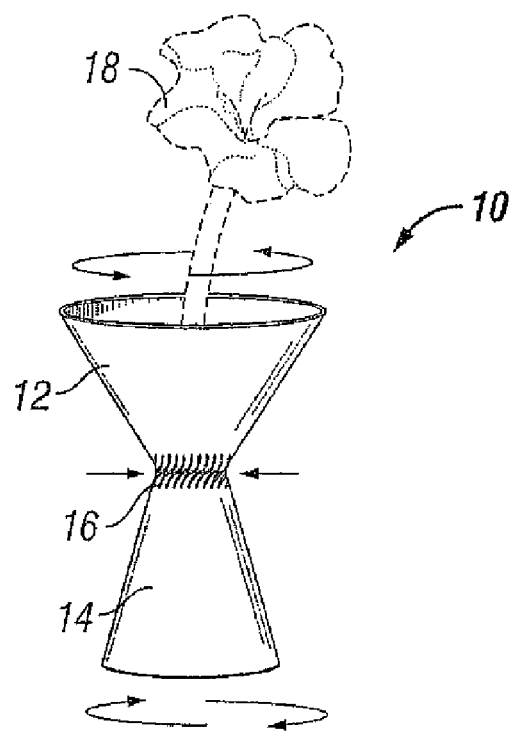
FIG. 4 is perspective view of motion of twisting and crimping an embodiment of the container.

Referring now to FIG. 4, there is illustrated one method of collapsing the intermediate portion 16. In this embodiment, the container 70 shown in FIG. 8 is designed with an intermediate portion 16 between the first portion 12 and the second portion 14 such that the first portion 12 and the second portion 14 are rotated in opposite directions. As shown, the first portion 12 is being rotated counterclockwise while the second portion 14 is being rotated clockwise. This action provides that the intermediate portion 16 will secure the floral product 18 in a single movement while the first and second portions 12, 14 remain with sufficient rigidity to support the floral product in an upright position. Those skilled in the art will recognize that a wire, paper, paper tie, covered wire tie, or ribbon can be used in conjunction with this or any embodiment described herein.

As shown in FIG. 5, a wrap or tie 22 is disposed about the intermediate portion 16 of the container 10. The tie may be a wired or paper crimp 22 placed on the intermediate portion 16 to insure that the intermediate portion 16 stays in contact with the floral product 18 and keeps the floral product 18 secure during use.

In the manufacture of container 70, sidewall 24 is formed from a sidewall blank which is die cut from a larger sheet or roll of paper or paperboard. The sidewall blank is coated with a known waterproof material such as plastic. The bottom blank is coated on at least its inner surface with a similar waterproof material. Polyethylene is preferably used because it serves as both an adhesive and a waterproof coating. Other types of biodegradable and/or recyclable waterproof and heat sealable coatings have been developed within the industry.

The sidewall 24 is treated by one of the treatment means. By passing the sidewall blank through an appropriate die or spray at a predetermined area on the sidewall blank. The die cut may be on the interior of the sidewall to assist in directing the inward collapse of intermediate portion 16.

The container bottom 26 is attached to the sidewall 24 of the container 70. The container bottom 26 is formed and then the container sidewall 24 is wrapped around the bottom 26 with the sidewall 24 being attached to the bottom 26 by an adhesive. Prior to being wrapped with the sidewall, the cup bottom is formed by passing a paper web across the cutter which cuts out a circular blank.

The bottom 26 comprises a disc-shaped base 60 and a cylindrical lip or skirt 62 projecting from an outer periphery of the base 60. The sidewall 24 is wrapped around the circumference of the lip 62, and an end 64 of the sidewall 24 is folded over the free edge of the lip 62. The lip 62 thus becomes sandwiched between portions of the container sidewall 24 and is bonded thereto by an adhesive. The edges of the sidewall are then glued to form a side seam.

After the container 70 has been manufactured, no assembly is required prior to use.

It should be appreciated that the container may be used to house objects other than floral products. For example, the container may house pencils, crayons, dried bamboo shoots and other dried floral materials or collectibles. The container would no longer need to be waterproof and only its dimensions would be varied to accommodate the objects to be housed in the container.

While particular embodiments of the subject invention have been described, it will be obvious to those skilled in the art that various changes and modifications of the subject invention can be made without departing from the spirit and scope of the invention. It will be clear to those skilled in the art that various changes and modifications may be made without departing from the scope of the invention and the invention is not to be considered limited to the embodiments and examples that are described in the specification.

What is claimed is:

1. A containment for housing at least one stem of a floral product in a liquid, the containment comprising:
    a container having a side, a bottom, and a top open to receive and house the at least one stem and liquid;
    the container being made of a common integral piece of material impermeable to the liquid and having rigidity to support upright the at least one stem with liquid;
    the material forming the side being treated to form a collapsible portion around the side;
    the collapsible portion forming a first non-collapsible portion and a second non-collapsible portion of the material of the container; and
    the first and second non-collapsible portions having a first position with respect to each other where the collapsible portion is not collapsed and a second position with respect to each other where the collapsible portion is collapsed into securing engagement with the at least one stem.

2. The containment of claim 1 wherein the collapsible portion forms interfaces with the non-collapsible portions.

3. The containment of claim 1 wherein the container forms a liquid receiving chamber.

4. The containment of claim 1 wherein the container is self-sufficient and does not require an inner member to house the at least one floral product.

5. The containment of claim 1 further including maintenance means to maintain the collapsible portion in the second position and the bottom being non-collapsible.

6. The containment of claim 1 wherein the container is self-supporting prior to the insertion of the at least one floral product and both before and after the collapsible portion is collapsed.

7. The containment of claim 1 wherein the top of the container includes an annular rim resisting crushing.

8. The containment of claim 1 wherein the collapsible portion is collapsed inwardly to the second position by crushing, folding, twisting, crimping, collapsing or other collapsing means including compressing, condensing, pinching or squeezing, while the non-collapsible portions retain a sufficient rigid structure to support the floral product in the container.

9. The containment of claim 1 wherein the portions form a sidewall that is first rigid, then pliable and then rigid again.

10. The containment of claim 1 wherein the first non-collapsible portion has a greater diameter than the second non-collapsible portion.

11. The containment of claim 1, wherein the container is stackable with other containers prior to use.

12. The containment of claim 1, wherein the container is stackable when assembled.

13. The containment of claim 1, wherein the material forming the collapsible portion is treated by a treatment means.

14. The containment of claim 13 wherein the treatment means includes chemically treating the material.

15. The containment of claim 13 the treatment means includes a plurality of slits in the side of the container.

16. The containment of claim 13 wherein the treatment means includes embossing fibers making up the material.

17. The containment of claim 13 wherein the treatment means includes forming pleats at a predetermined location.

18. The containment of claim 1 wherein the first and second non-collapsible portions are pinched or twisted with respect to each other to move from the first position to the second position and the first and second non-collapsible portions remain uncollapsed in the first and second positions.

19. The containment of claim 1 wherein the first and second non-collapsible portions are deformable to accommodate the collapse of the collapsible portion.

20. The containment of claim 1 wherein the collapsible portion maintains the first and second non-collapsible portions in the second position.

21. The containment of claim 1 wherein the collapsible portion is pre-formed.

22. An apparatus for housing at least one stem of a floral product in a liquid, the apparatus comprising:
   a container having a side with a circular cross-section, a bottom, and an open top to receive and house the at least one stem and liquid;
   the container being made of a common integral piece of material impermeable to the liquid, causing the container to be non-foldable, and to have a rigidity that will support upright the at least one stem with liquid;
   the side having an annular pre-formed collapsible portion forming a first non-collapsible portion and a second non-collapsible portion of the container;
   the annular pre-formed collapsible portion including a maintenance means around the container; and
   the first and second non-collapsible portions having a first position with respect to each other prior to the insertion of the at least one stem where the annular pre-formed collapsible portion is not collapsed and a second position with respect to each other where the annular pre-formed collapsible portion is collapsed into securing engagement with the at least one stem, the maintenance means maintaining the annular pre-formed collapsible portion in the second position.

23. A method of containing at least one floral product which comprises the steps of:
   (a) providing a container having a first portion, a second portion, and an intermediate portion between the first portion and the second portion, said portions all being made of a common integral piece of non-collapsible material;
   (b) treating the intermediate portion of the container to form a collapsible portion;
   (c) placing liquid into the container, wherein the container is capable of containing the liquid and at least one stem of each floral product and wherein the intermediate portion is capable of collapsing around at least a portion of each stem;
   (d) inserting at each stem into the container; and
   (e) collapsing the intermediate portion about at least a portion of each stem.

24. An apparatus for housing at least one stem of a floral product in a liquid, the apparatus comprising:
   a container having a side with a circular cross-section, a bottom, and an open top to receive and house the at least one stem and liquid;
   the container being made of a common integral piece of coated paper impermeable to the liquid, causing the container to be non-foldable, and to have a rigidity that will support upright the at least one stem with liquid;
   the side having an annular collapsible portion made of a plurality of cuts in the paper, the collapsible portion forming a first non-collapsible portion and a second non-collapsible portion of the container;
   the annular collapsible portion including a maintenance means around the container; and
   the first and second non-collapsible portions having a first position with respect to each other prior to the insertion of the at least one stem where the annular collapsible portion is not collapsed and a second position with respect to each other where the cuts in the annular collapsible portion collapse into securing engagement with the at least one stem, the maintenance means maintaining the annular collapsible portion in the second position.

25. The apparatus of claim 24 wherein the plurality of cuts are slits through the side of the container.

* * * * *

UNITED STATES PATENT AND TRADEMARK OFFICE
CERTIFICATE OF CORRECTION

PATENT NO. : 7,571,566 B1  
APPLICATION NO. : 12/243662  
DATED : August 11, 2009  
INVENTOR(S) : Nancy A. Taylor Page 1 of 1

It is certified that error appears in the above-identified patent and that said Letters Patent is hereby corrected as shown below:

Column 1, Line 24, change [[doe]] to does

Column 1, Line 34, change [[storage]] to stored

Column 1, Line 61, change that [[are]] more to that is more

Column 4, Line 6, change [[10]] to 70

Column 4, Line 66, delete "up"

Column 11, Line 7, claim 15, after "claim 13" add wherein

Signed and Sealed this

Third Day of November, 2009

David J. Kappos  
*Director of the United States Patent and Trademark Office*